US011291327B2

(12) United States Patent
Koennings et al.

(10) Patent No.: US 11,291,327 B2
(45) Date of Patent: Apr. 5, 2022

(54) MULTI-FUNCTION COOKING APPARATUS WITH SYNCHRONIZED FOOD PROCESSING FOR A REMOTE KITCHEN APPLIANCE

(71) Applicant: Vorwerk & Co. Interholding GmbH, Wuppertal (DE)

(72) Inventors: Maximilian Koennings, Zurich (CH); Maria Jose Resende, Lisbon (PT); Georg Hackert, Bochum (DE); Julius Ganns, Wuppertal (DE); Stefan Hilgers, Essen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 574 days.

(21) Appl. No.: 15/427,982

(22) Filed: Feb. 8, 2017

(65) Prior Publication Data

US 2017/0224148 A1    Aug. 10, 2017

(30) Foreign Application Priority Data

Feb. 9, 2016   (EP) .................................... 16154848

(51) Int. Cl.
*A47J 27/00*   (2006.01)
*G05B 19/418*   (2006.01)
(Continued)

(52) U.S. Cl.
CPC ........... *A47J 27/002* (2013.01); *A47J 36/321* (2018.08); *G05B 15/00* (2013.01);
(Continued)

(58) Field of Classification Search
CPC .......... G05B 19/41835; G05B 19/0426; G01B 15/00
See application file for complete search history.

(56) References Cited

U.S. PATENT DOCUMENTS

| 6,587,739 B1 | 7/2003 | Abrams et al. |
| 6,753,027 B1 * | 6/2004 | Greiner ..................... F24C 7/08 374/E7.042 |

(Continued)

FOREIGN PATENT DOCUMENTS

| CN | 102809932 A | 12/2012 |
| CN | 203324712 U | 12/2013 |

(Continued)

OTHER PUBLICATIONS

English translation of First Office Action for Chinese Application No. 201710070896.4, dated Jan. 23, 2019, 20 pages.

(Continued)

*Primary Examiner* — Matthew D Krcha
(74) *Attorney, Agent, or Firm* — Brake Hughes Bellermann LLP

(57) ABSTRACT

A control system is described for synchronizing food processing steps performed by a multi-function cooking apparatus with food processing steps performed by one or more remote kitchen appliances, includes a recipe program interface for accessing a recipe program on a data storage device wherein the recipe program is configured to be executed by the cooking apparatus and has internal instructions configured to control functions of the cooking apparatus for performing food processing steps thereon, and has at least one external instruction for a remote food processing step performed by a particular remote kitchen appliance.

6 Claims, 8 Drawing Sheets

(51) Int. Cl.
*G05B 15/00* (2006.01)
*A47J 36/32* (2006.01)
*G05B 19/042* (2006.01)

(52) U.S. Cl.
CPC ... *G05B 19/0426* (2013.01); *G05B 19/41835* (2013.01); *G05B 2219/2613* (2013.01); *G05B 2219/2643* (2013.01)

(56) References Cited

U.S. PATENT DOCUMENTS

| | | | |
|---|---|---|---|
| 8,624,169 B1 * | 1/2014 | Sorenson | A47J 37/0709 219/386 |
| 2004/0058706 A1 | 3/2004 | Williamson et al. | |
| 2008/0105134 A1 * | 5/2008 | Elston, III | D06F 39/005 99/325 |
| 2013/0297042 A1 * | 11/2013 | Reese | G05B 19/02 700/3 |
| 2014/0170275 A1 | 6/2014 | Bordin | |
| 2015/0064314 A1 * | 3/2015 | Manuel | A47J 27/62 426/231 |
| 2015/0334785 A1 | 11/2015 | Visher et al. | |

FOREIGN PATENT DOCUMENTS

| | | |
|---|---|---|
| CN | 104133386 A | 11/2014 |
| CN | 104133387 A | 11/2014 |
| EP | 0089247 A1 | 9/1983 |
| EP | 2775212 A1 | 9/2014 |
| WO | 9717642 A2 | 5/1997 |
| WO | WO-2013184058 A1 * | 12/2013 |

OTHER PUBLICATIONS

Ogata, Katsuhiko, "Modern Control Engineering", Ogata; "Modern Control Engineering"; Fifth Edition, 905 pages., 905 pages.
Notice of Opposition and Opposition Brie filed in EP Patent No. 3206095 on Mar. 26, 2019, 24 pages.
Ogata, Katsuhiko, "Modern Control Engineering", Ogata; "Modern Control Engineering"; Fifth Edition, 905 pages., 905 pages, 2010.

* cited by examiner

MULTI-FUNCTION COOKING APPARATUS WITH SYNCHRONIZED FOOD PROCESSING FOR A REMOTE KITCHEN APPLIANCE

CROSS-REFERENCE TO RELATED APPLICATION

This application claims priority to, and is a continuation of, EP16154848.2, filed on Feb. 9, 2016 and entitled "System and Method for Synchronizing Food Processing Steps of a Multi-Function Cooking Apparatus with Food Processing Steps of a Remote Kitchen Appliance" the entirety of which is hereby incorporated by reference.

TECHNICAL FIELD

The present disclosure generally relates to a cooking apparatus, and more particularly, relates to operating the cooking apparatus under changing operating conditions with reproducible cooking results.

BACKGROUND

Cooking apparatuses (cooking devices) have become more and more intelligent in the recent past by integrating multiple functions into the apparatus. For example, modem cooking devices integrate functions, such as heating, mixing, boiling, pureeing, etc., in a single multi-function cooking device. A cooking device typically has to be operated with appropriate technical parameter settings (e.g., temperature settings, rotational speed settings, etc.) to ensure proper operation. Proper operation of a cooking device as used hereinafter includes correct, safe and/or secure operation for producing reproducible cooking results with the cooking apparatus with regards to a particular food product. Such a food product may include multiple food components which may be served in one or more courses of a menu.

Sometimes, the functions of such a multi-functional cooking apparatus are not sufficient to prepare the entire food product without additional kitchen appliances. The additional kitchen appliances may be used for performing cooking steps (e.g., operations) involving the food product or a component of the food product remotely from the multi-functional cooking apparatus. Such kitchen appliances are referred to as "remote kitchen appliances" hereinafter. "Remote" in this context therefore stands for physically not integrated with the cooking apparatus.

A desired cooking result of a particular food product is thereby defined as the cooking result which is provided by the cooking apparatus in cooperation with the one or more remote kitchen appliances when being operated in accordance with a predefined recipe program for the food product under predefined operating conditions of the cooking apparatus and the remote appliances (e.g., maximum heating/cooling power, heating/cooling gradient, etc.). A reproducible cooking result, as used hereinafter, is a cooking result which deviates from a desired cooking result less than a predefined tolerance range. In other words, the desired cooking result can be described by measurable parameters such as for example, consistency, shape, color, temperature, timely availability, and/or taste of the cooked food product. If such parameters fall within the predefined tolerance range the produced food product is defined as a reproduction of the desired cooking result, and therefore the processing of the recipe program by the cooking apparatus leads to a reproducible cooking result.

The actual operating conditions of the cooking apparatus and/or remote kitchen appliances while processing a recipe program may deviate from the ideal conditions which are the bases for the recipe program. For example, a remote kitchen appliance used for applying food processing steps (e.g., operations) to a component of the food product may show a different technical behavior than expected by the recipe program. For example, a heating control does not reach the maximum temperature expected by the recipe program or the heating power is not sufficient to get to the desired temperature at the speed expected by the recipe program.

Any such deviating operating condition will typically lead to a situation that the cooking result under such deviating operating conditions substantially deviates from the desired cooking result under the conditions because subsequent steps (e.g., operations) of the recipe program are affected negatively. In other words, the achieved cooking result under the deviating operating conditions may typically fall outside the predefined tolerance range for accomplishing reproducible meals.

Therefore, it is a problem to synchronize the multi-function cooking apparatus with the one or more remote kitchen appliances under the actual operating conditions so that reproducibility of the food product is preserved.

SUMMARY

In general, a multi-function cooking apparatus, as used hereinafter, supports at least semi-automated cooking. Semi-automated cooking support in the context of this disclosure means that at least some of the cooking steps (e.g., operations) for preparing a meal with the cooking apparatus can be automatically performed by the cooking apparatus by executing a particular recipe program for the meal. However, there may also be some cooking steps (food processing steps) that include user interaction, such as for example, filling the cooking apparatus with particular ingredients. There may also be cooking steps (e.g., operations) that include the preparation of a food component of the food product on another multi-function cooking apparatus (e.g. with a similar functionality) or a remote kitchen appliance (e.g., a refrigerator, an oven, a heating plate, etc.). Technical parameter settings of the recipe program can automatically control corresponding cooking functions of the cooking apparatus. For example, a temperature parameter setting can control the temperature of the cooking apparatus. A rotational speed parameter setting can control the rotational speed at which one or more rotatable components of the cooking apparatus rotate.

Further technical parameter settings (e.g., a temperature parameter setting to control the temperature of the remote kitchen appliance) can affect the cooking steps (e.g., operations) on the remote kitchen appliance. For example, the further parameter settings can be sent from the cooking apparatus to the remote kitchen appliance in case an appropriate communicative coupling exists between the respective devices through which the devices can communicate based on an appropriate communication protocol. In an alternative, the cooking apparatus can provide the further parameter settings via an appropriate output means (e.g., a display or audio output) to a user to provide the user with respective operating instructions including control parameters to be applied to the remote kitchen appliance.

In one embodiment, a control system is having access to synchronize food processing steps (e.g., operations) performed by the multi-function cooking apparatus with food processing steps (e.g., operations) performed by one or more remote kitchen appliances. The control system can be an integral part of the cooking apparatus itself or it may be implemented on a control device which is communicatively coupled with the cooking apparatus but operated remotely. In a remote control scenario the control system may be implemented on a mobile device, such as for example, a smartphone or a tablet computer, or it may be part of a remote cloud based server implementation. Dependent on the implementation scenario the control system may communicate with the cooking apparatus via an internal communication bus (control system is part of the cooking apparatus), via power line communication, via a wireless local area network (WLAN), via short range communication (e.g. BLUETOOTH, ZigBee, etc.), via near field communication (NFC) technology (control system is part of a mobile device operated in the vicinity of the cooking apparatus), or via wide area networks such as the Internet or mobile communication networks (e.g., GSM, UMTS, etc.; i.e. the control system is part of a remote server solution).

The control system has a recipe program interface having access to access a recipe program on a data storage device. The recipe program is executed by the cooking apparatus and has internal instructions to control functions of the cooking apparatus for performing food processing steps (e.g., operations) thereon. It further includes at least one external instruction for a remote food processing step performed by a particular (at least one) remote kitchen appliance. The recipe program is configured so that food processing steps (e.g., operations) performed by the cooking apparatus are in sync (e.g., coordinated) with food processing steps (e.g., operations) performed by the particular (e.g., at least one) remote kitchen appliance when the food processing steps (e.g., operations) are performed in compliance with corresponding control parameter settings in the recipe program instructions. In other words, if the cooking apparatus and the particular (e.g., at least one) remote kitchen appliance perform the cooking steps (e.g., operations) according to the instructions of the recipe program, the completion of food processing steps (e.g., operations) for various food components of the food product is finished in time so that a particular food component (used as input for the further processing of the food product) is available at the right time to guarantee a reproducible cooking result for the final food product.

The recipe program storage can be external to the control system or can be an integral part of it. For example, recipe programs may be provided by a remote recipe server solution or they may be stored on a mobile data carrier (e.g., USB stick, CD, DVD, etc.) which can be communicatively coupled with the control system. For example, a recipe program can include instructions with regards to types of ingredients, quantity of ingredients, a sequence for adding or mixing ingredients, control values (e.g., operating parameter settings such as, temperature, speed of the knife, direction of knife rotation, processing time. etc.) for the various food processing steps (e.g., operations), and the duration for the various processing steps. Further, a recipe program can include internal instructions (instructions affecting internal functions of the cooking apparatus) and/or external instructions (instructions affecting one or more remote kitchen appliances).

The control system further has a control parameter interface that can receive actual control parameter values from sensors monitoring respective cooking functions. For example, an internal sensor of the cooking apparatus may provide temperature data representing the current temperature in the cooking bowl of the apparatus. Further, the control system may receive temperature data from a remote temperature sensor which is used to monitor the temperature of a food component being processed by a particular (e.g., at least one) remote kitchen appliance. That is, the temperature data received from the remote temperature sensor reflects one or more temperature values associated with the component of the food product being processed by the particular (e.g., at least one) remote kitchen appliance in response to the execution of the at least one external instruction. The execution of the at least one external instruction by the cooking apparatus triggers the application of respective control parameter settings to the remote kitchen appliance. For example, the external instruction may include instructions for the remote kitchen appliance to heat the food component at 80 degrees for five minutes. In one embodiment, the control parameters are directly communicated to the remote kitchen appliance and automatically adjust the control parameter setting of the remote kitchen appliance accordingly. In an alternative embodiment, the control parameters are communicated to a human user and brief the user to apply the settings to the remote kitchen appliance. However, the further steps do not depend on whether the user really reacts accordingly. Moreover, the further steps executed by the respective control system components are suitable to synchronize the cooking apparatus with the remote kitchen appliance even in cases of poor control parameter settings (i.e. control parameter settings which deviate from those given in the external instructions).

A control parameter evaluator of the control system can check compliance of the received temperature data with control parameters of the at least one external instruction. In other words, the control parameter evaluator compares the received temperature data and checks whether they fall into a tolerance range around the parameter settings included in the external instruction(s).

In one embodiment, the control parameter evaluator can compute, based on the received temperature data, a prediction value for the point in time when the performing of the remote food processing step of a particular (e.g., at least one) remote kitchen appliance in response to the at least one external instruction will be completed (e.g., reach a predetermined condition). Thereby, it is irrelevant if the parameter settings according to the external instructions were actually applied to the particular (e.g., at least one) remote kitchen appliance. It is sufficient that the control parameter evaluator knows the parameter settings of the external instructions which should be applied to the remote kitchen appliance. In other words, the control parameter settings in the external instructions are taken as given by the control parameter evaluator and the remote kitchen appliance is expected to respond to such settings accordingly. For example, prediction methods can perform complex computations based on the received temperature data which may include a spatial temperature profile reflecting the temperature gradation inside the food component. The computed prediction value is then compared with a termination time value expected according to the control parameters of the recipe program. If the control parameter evaluator determines a difference between the prediction value and the expected value exceeding a predefined threshold value, a lack of compliance of the received temperature data with the control parameters of the at least one external instruction is determined.

A recipe program adjustment component of the control system can adjust not-yet-executed program instructions of the recipe program based on the evaluation of the received temperature data in case the received temperature data does not comply with the control parameters of the at least one external instruction. Not-yet-executed program instructions are program instructions which are subsequent to the program instruction which is currently executed by an interpreter of an execution engine of the cooking apparatus. Thereby, the adjustment is performed in a way to re-synchronize the cooking apparatus with the particular (e.g., at least one) remote kitchen appliance. For example, the adjustment component can reschedule the execution of internal program instructions which depend on the completion of the remote food processing step by the remote kitchen appliance in response to the at least one external program instruction in accordance with the prediction value. That is, no matter whether the remote processing step takes longer or shorter than anticipated in the original external program instructions, the start of the dependent internal food processing steps by the cooking apparatus is synchronized with the termination of the remote food processing step on the remote kitchen appliance.

In one embodiment, the recipe program has further external instructions affecting remote food processing steps performed a further remote kitchen appliance. In this case the recipe program adjustment component may be further able to adjust the further external instructions to re-synchronize the cooking apparatus and the further remote kitchen appliance with the particular (e.g., at least one) remote kitchen appliance. As a consequence, the control system can synchronize the cooking apparatus with an arbitrary number of remote kitchen appliances being affected by corresponding external instructions of the recipe program. Thereby, the adjustment component adjusts one or more internal instructions of the not-yet-executed program instructions and/or one or more external instructions of the not-yet-executed program instructions.

Further embodiments of the present disclosure relate to a multi-function cooking apparatus including a control system as previously disclosed, a food processing method involving a cooking apparatus while executing machine readable program instructions of a recipe program for preparing a food product to synchronize food processing steps performed by the cooking apparatus with food processing steps performed by at least one remote kitchen appliance, and a computer program product having computer program instructions which when being loaded into a memory of the control system and being executed by at least one processor of the control system cause the at least one processor to execute the steps of said food processing method.

The method includes the steps (e.g., operations): receiving, from a remote temperature sensor, temperature data reflecting one or more temperature values associated with a component of the food product wherein the food component is processed by the particular (at least one) remote kitchen appliance in response to the execution of the at least one external instruction; if the received temperature data complies with control parameters of the at least one external instruction, upon completion of the remote food processing step, proceeding with processing the food product on the cooking apparatus according to the internal instructions; and if the received temperature data does not comply with the control parameters of the at least one external instruction, adjusting not-yet-executed program instructions of the recipe program based on the evaluation of the received temperature data to re-synchronize the cooking apparatus with the particular (e.g., at least one) remote kitchen appliance.

In a further embodiment, the computer program instructions may be stored on a computer readable medium forming said computer program product.

In another general aspect, a control system is described for synchronizing food processing steps performed by a multi-function cooking apparatus with food processing steps performed by one or more remote kitchen appliances, the system including: a recipe program interface having access to a recipe program on a data storage device, where the recipe program is configured to be executed by the cooking apparatus and where the recipe program has internal instructions configured to control functions of the cooking apparatus for performing food processing steps thereon, and has at least one external instruction for a remote food processing step performed by a first remote kitchen appliance; a control parameter interface configured to receive, from a remote temperature sensor, temperature data reflecting one or more temperature values associated with a component of food product being processed by the first remote kitchen appliance, in response to the execution of the at least one external instruction; a control parameter evaluator configured to check compliance of the received temperature data with control parameters of the at least one external instruction; and a recipe program adjustment component configured to adjust, not-yet-executed program instructions of the recipe program, if the received temperature data does not comply with the control parameters of the at least one external instruction, the adjustment being based on the evaluation of the received temperature data to re-synchronize the cooking apparatus with the first remote kitchen appliance where not-yet-executed program instructions correspond to program instructions subsequent to the currently executed program instruction. Other embodiments of this aspect include corresponding computer systems, apparatus, and computer programs recorded on one or more computer storage devices, each configured to perform the actions of the methods.

Implementations may include one or more of the following features. The control system where the recipe program further includes additional external instructions affecting remote food processing steps performed by a second remote kitchen appliance and where the recipe program adjustment component is further configured to adjust the additional external instructions to re-synchronize the cooking apparatus and the second remote kitchen appliance with the first remote kitchen appliance. The control system where the received temperature data includes a spatial temperature profile reflecting a temperature gradation inside a component of food product. The control system where the control parameter evaluator is further configured to: compute, based on the received temperature data, a prediction value for a point in time when the execution of the remote food processing step of the first remote kitchen appliance, in response to the at least one external instruction will terminate; compare the prediction value with a termination time value expected according to the control parameters of the recipe program; and determine a lack of compliance of the received temperature data with the control parameters of the at least one external instruction if the difference between the prediction value and the expected value exceeds a predefined threshold value. The control system where the recipe program adjustment component is configured to adjust one or more internal instructions of the not-yet-executed program instructions. The control system where the recipe program adjustment component is configured to adjust one or more external instructions of the not-yet-executed program instructions. A multi-function cooking apparatus including the control system according. Implementations of the described techniques may include hardware, a method or process, or computer software on a computer-accessible medium.

Further aspects of the present disclosure will be realized and attained by means of the elements and combinations particularly depicted in the appended claims. It is to be understood that both the foregoing general description and the following detailed description are exemplary and explanatory only, and are not restrictive of the present disclosure as described.

DETAILED DESCRIPTION

Figure 1A:
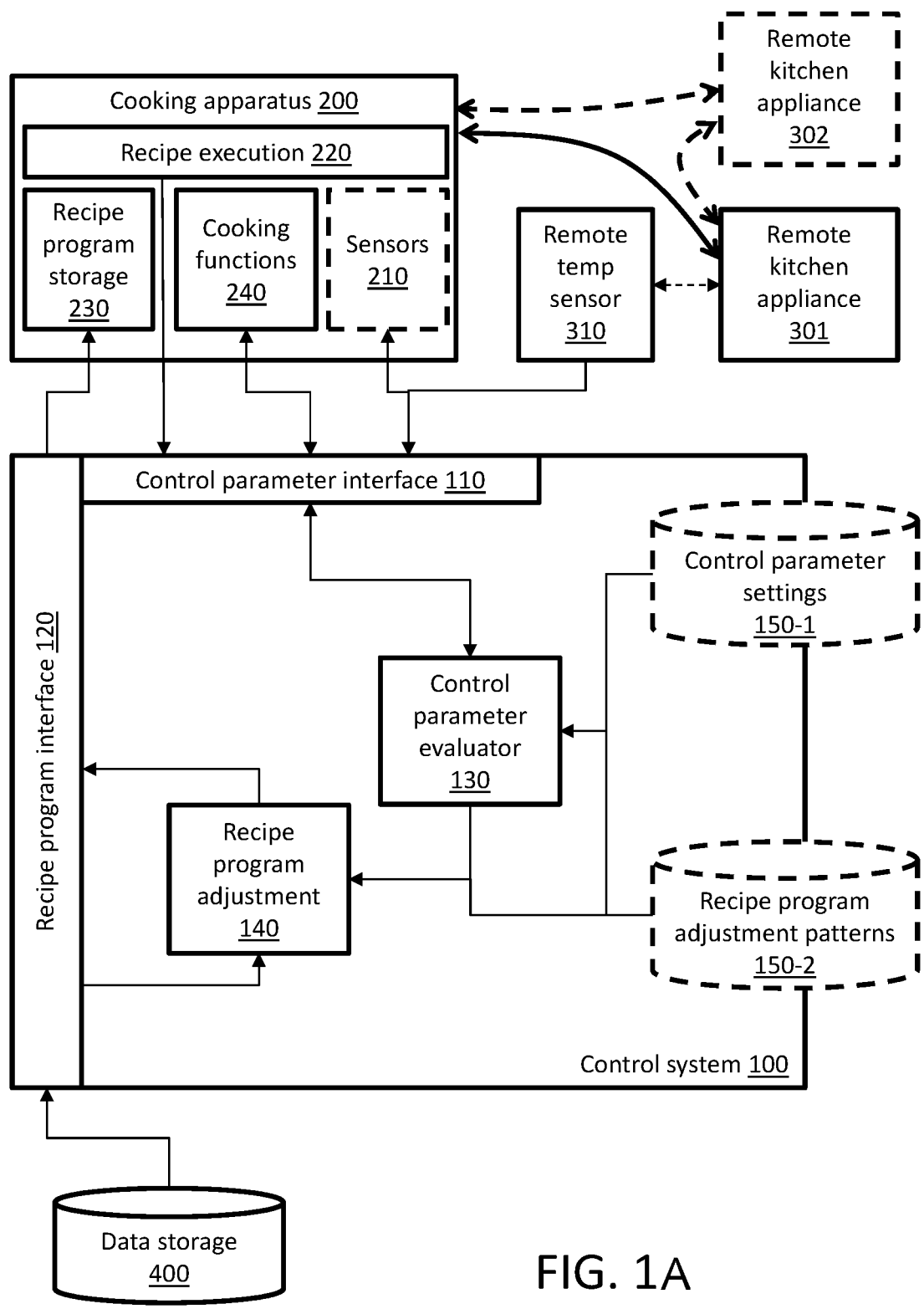
FIGS. 1A-1B are component diagram of a control system according to one embodiment of the present disclosure for synchronizing food processing steps performed by a multi-function cooking apparatus.
Figure 1B:
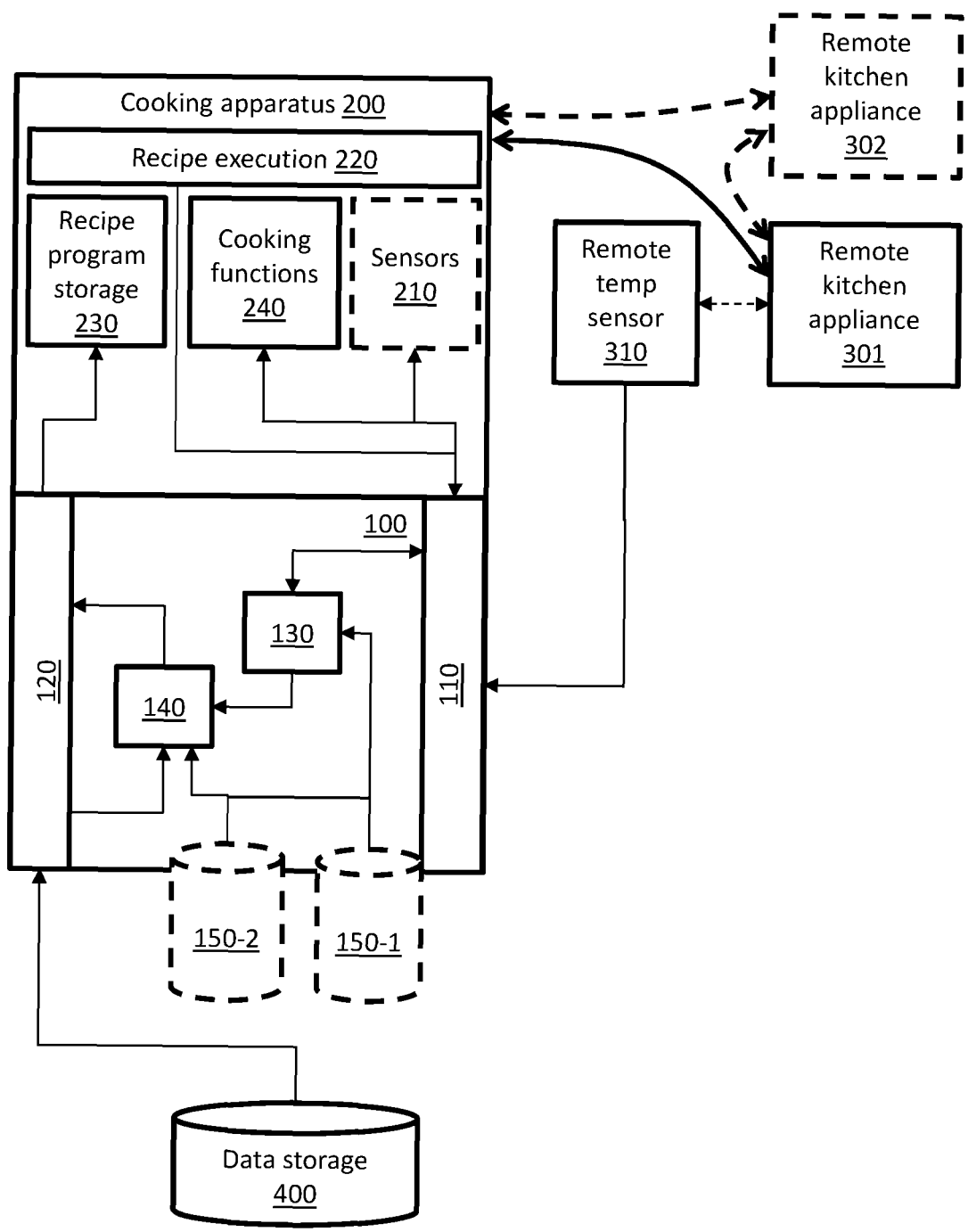
Figure 2:
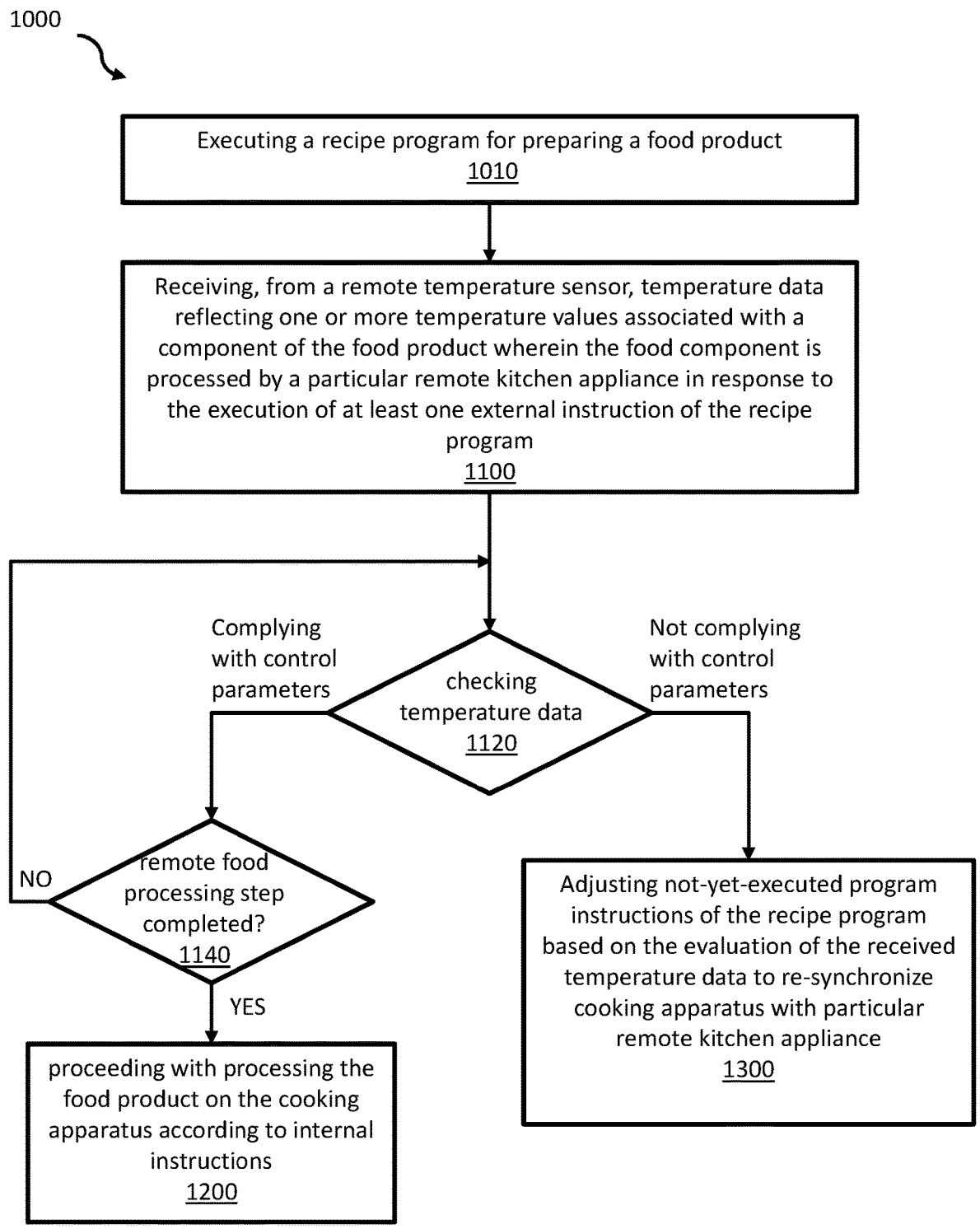
FIG. 2 is a simplified flow chart of a computer-implemented control method for synchronizing food processing steps performed by a multi-function cooking apparatus with food processing steps performed by one or more remote kitchen appliances according to one embodiment of the present disclosure.
Figure 3:
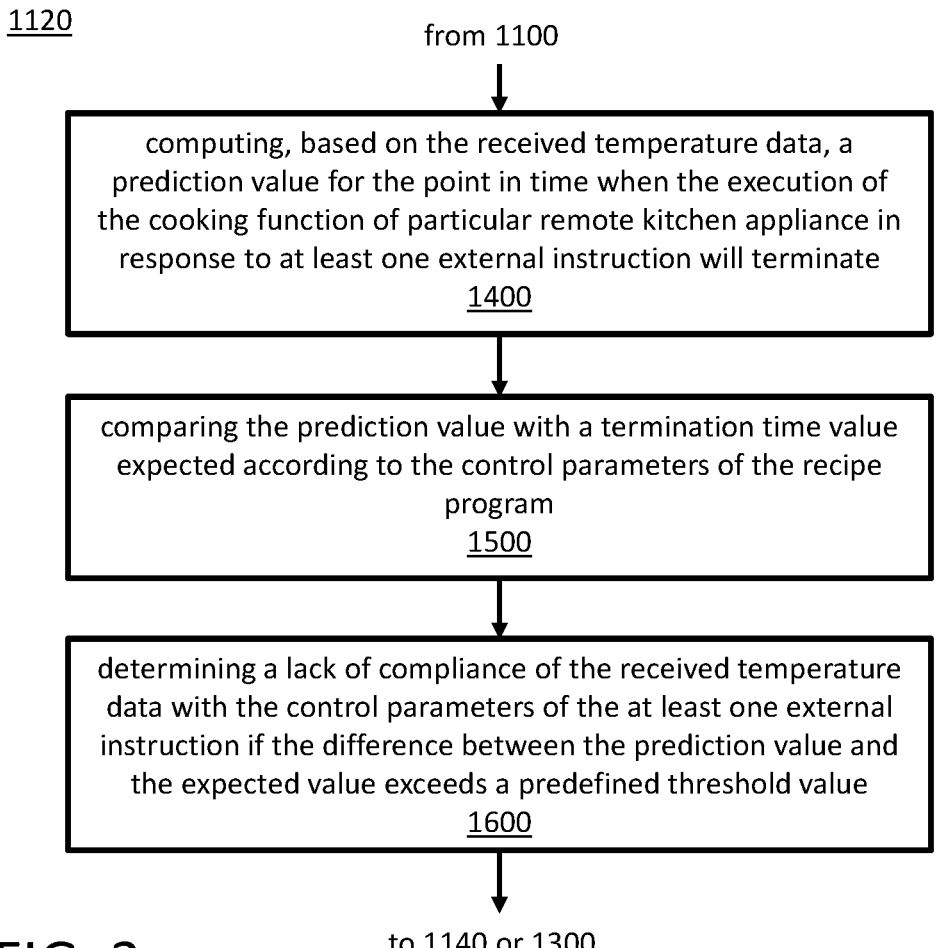
FIG. 3 is a simplified flow chart illustrating sub-steps of the control method for determining recipe program readjustment conditions.

FIGS. 1A-1B are component diagrams of a control system 100 for synchronizing food processing steps performed by a multi-function cooking apparatus 200. FIG. 1A is a simplified component diagram of a control system 100 for synchronizing food processing steps performed by a multi-function cooking apparatus 200 with food processing steps performed by one or more remote kitchen appliances (RKA) 301, 302 according to one embodiment of the present disclosure. The remote kitchen appliances are physically separated from the cooking apparatus but are in a distance from the cooking apparatus that allows the subsequent combination of the respective food components into the food product. FIG. 1A will be described in the context of the simplified flowchart of FIG. 2 for the method 1000 being executed by the control system 100. The following description makes use of reference numbers referring to both, FIG. 1A and FIGS. 2, 3.

The control system 100 is communicatively coupled with the cooking apparatus 200 via interface components 110, 120. The interfaces can have any appropriate interface type supporting the exchange of data between the cooking apparatus 200 and the control system 100. For example, a serial interface (e.g., a USB interface) or a parallel interface (e.g., an IEEE 1284 interface), or an internal communication bus may be used. The control system 100 can be an integrated component of the cooking apparatus 200 or it can be implemented remotely (e.g., on a mobile device like a smartphone or tablet PC, or on a remote server which may communicate with the cooking apparatus over the Internet or mobile communication standards or wired communication standards or wireless communication standards). FIG. 1B illustrates an embodiment, where the control system 100 is implemented as an integrated component of the cooking apparatus. FIG. 1A illustrates the control system 100 implemented on a remote device, such as a smartphone, tablet computer or even on a remote server. Advantageously, the remote device has a communicative coupling with the cooking apparatus so that the control system can communicate with the cooking apparatus in real time. The following description relates to the embodiments of FIG. 1A and FIG. 1B.

The control system is further communicatively coupled (e.g., via control parameter interface 110) with a remote temperature sensor (RTS) 310. The RTS 310 can to monitor the temperature of a food component which is prepared by the RKA 301. However, the RTS 301 may not be a part of the remote kitchen appliance. The RTS 310 can be any stand-alone temperature sensor which is communicating with the control system 100 via a wired or wireless connection. For example, the RTS 310 may be inserted into the food component and to measure the temperature inside the food component. In another example, the RTS 310 can measure infrared radiation emitted by the food component or from the RKA 301 and transform the measured radiation values into corresponding temperature values. A person skilled in the art can make use of any appropriate temperature sensor technology suitable to determine the temperature of the food component processed by the RKA 301.

Via the recipe program interface 120, the control system 100 is further communicatively coupled with a data storage device 400 storing recipe programs for the cooking apparatus 200. The data storage device 400 can be any device with a memory for storing data in electronic format (e.g., a memory stick/card, a memory disk on a remote server, etc.). In some embodiments, the data storage device may be physically connected with the cooking apparatus (e.g., via a USB plug). In other embodiments, the data storage device may be connected via an appropriate network connection (e.g., LAN, WAN or WLAN connection). The data storage device may have a database or a file system to store recipe programs which are intended to be executed by the cooking apparatus. A recipe program example is disclosed in the context of FIGS. 6A, 6B. A recipe program is a digital recipe stored as a data structure which includes a plurality of control instructions (referred to as recipe program instructions or program instructions hereinafter) with technical parameter settings to control food processing steps of functions performed by the cooking apparatus 200 when the recipe program is executed by a recipe execution component 220 of the cooking apparatus 220.

A particular recipe program may be executed 1010 by the cooking apparatus 200 to produce a food product. The recipe program has internal instructions may control functions 240 of the cooking apparatus 200 for performing food processing steps thereon. It may further include one or more external instructions affecting one or more remote food processing steps performed by a particular RKA 301. External instructions are also processed by the recipe execution 220. For example, in case of a communicative coupling of the cooking apparatus with a particular remote kitchen appliance the cooking apparatus can provide control parameters of the external instruction to an IP address associated with the particular remote (e.g., at least one) kitchen appliance. For example, the cooking apparatus may directly communicate with the particular remote kitchen appliance, e.g., via a BLUETOOTH or NFC connection (direct coupling), or, for example, it may communicate with the kitchen appliance via a router (e.g., WLAN router) or a repeater of a wireless network (indirect coupling). If there is no communicative coupling, the external instruction may be a display instruction to display the control parameters to the user of the cooking apparatus and instructing the user to apply the respective parameter settings to the remote kitchen appliance. The particular recipe program is can guarantee a synchronized flow of food processing steps performed by the cooking apparatus and one or more remote kitchen appliances involved in the preparation of the food product. In other words, a food product which comprises multiple food components is prepared by a sequence of food processing steps for the various food components. Some of the food processing steps may be performed sequentially on one of the cooking devices. Some of the food processing steps may be performed in parallel by the cooking apparatus and, for example, the RKA 301. In such scenarios the synchronization of the food processing steps may become critical for successful completion of the food product. For example, the RKA 301 may perform food processing steps to prepare a food component used as input for the further processing of the food product by the cooking apparatus (or vice versa). To guarantee a high quality reproducible cooking result for the food product it can be important that the food component used as input for the further processing is available at the right time to enable a seamless processing of the food product. Therefore, it is advantageous when the cooking device which is used for the further processing of the food component is in the correct technical state to continue with the processing of the food component according to the recipe instructions without inappropriate delays. An inappropriate delay that may cause a status change of a food component (e.g., a temperature change) which is disadvantageous for subsequent processing steps. That is, the recipe program is may enable avoidance of such delays if the food processing steps are all performed according to control parameters of the respective recipe instructions. In this case the cooking devices are synchronized. If however a food processing step takes longer or shorter than expected according to the control parameter settings the cooking devices will get out of sync and the reproducibility of the cooking result for the food product is at risk. In this case the cooking devices (cooking apparatus, one or more remote kitchen appliances) may be re-synchronized.

The cooking apparatus 200 has a memory component 230 to store the recipe program instructions of the particular recipe program. The instructions are to be processed by the recipe execution component 220. For example, the recipe execution component 220 can include an interpreter for interpreting the recipe instructions. The basic cooking functions are then performed by respective hardware components 240 (e.g., motor, heating means, scales, etc.) of the cooking apparatus under the control of the execution component 220. Basic cooking functions using different hardware may be performed in parallel (e.g., heating and stirring). That is, the execution component 220 transforms the program instructions into control signals applied to the hardware components 240. A person skilled in the art can build a corresponding interpreter for this purpose. Persons of skill in the art can implement the mapping of program instructions to hardware control signals, for example, by using instructions in machine-code that control the hardware components directly. In case the cooking apparatus receives adjusted recipe program instructions (e.g. via recipe program interface 120) from the control system 100, the adjusted recipe program instructions may replace the corresponding original program instructions stored in the memory component 230. Thereby, internal instructions relate to recipe instructions which are controlling food processing steps performed by the cooking apparatus 200 itself. External instructions relate to recipe instructions which affect food processing steps performed by the remote kitchen appliance 310. Both types of instructions can include control parameter settings for the respective device. For example, in case the particular recipe program includes a recipe for a food product including multiple food components (e.g., steak, fried potatoes and spicy pepper sauce) different parts of the recipe program relate to the corresponding food components of the food product. For example, the fried potatoes and the spicy pepper sauce may be processed by the cooking apparatus 200 whereas the steak may be remotely processed in a pan on a hotplate 301 which is separate from cooking apparatus 200. In this case the recipe program may include internal instructions can control respective cooking functions 240 (e.g., heating, stirring, etc.) of the cooking apparatus 200 for processing the fried potatoes and the spicy sauce. It may further include external instructions including control parameters (e.g., heating temperature, heating time) for the food processing of the steak by the remote hotplate.

The recipe program interface 120 of the control system can access and retrieve recipe programs from the data storage 400 and forward the retrieved recipe programs directly to the cooking apparatus for execution 1010 if no recipe adjustments are necessary. However, the control system 200 is can adjust recipes instructions under certain conditions before they are forwarded to the cooking apparatus. Adjusted recipe instructions may also be sent to the cooking apparatus 200 to overwrite already loaded recipe instructions with the adjusted recipe instructions in cases where the actual operating conditions deviate from predefined operating conditions while the cooking apparatus is already executing a recipe program. As explained earlier, the recipe programs retrieved from the recipe program storage 400 are designed to provide optimal and reproducible cooking results for respective meals (food products) when the cooking apparatus and the respective remote kitchen appliances are operated under predefined orating conditions while executing the respective recipe programs. For monitoring the actual operating conditions of the cooking apparatus, the apparatus 200 has a plurality of sensors 210 for measuring actual technical parameter values which reflect the current technical status (actual operating conditions) of the machine.

For monitoring the actual operating conditions of the RKA 301 the RTS 310 may be used. The RTS 310 is not directly coupled with the RKA 301 but rather is can indirectly monitor the operating conditions of the remote kitchen appliance by measuring temperature values in its environment as a result of a particular control parameter setting applied to RKA 301. For example, an external instruction of the recipe program may relate to a food processing step performed by the RKA 301 on the steak food component and may include control parameters for RKA 301 to heat the steak at a given temperature for a given time interval. As mentioned earlier, the control parameters can be directly communicated by the cooking apparatus to the RKA 301 in case of a communicative coupling. Alternatively, the control parameters included in the external instruction can be displayed to the user of the cooking apparatus 200 when processing the external instructions with the recipe execution engine 220 and the user can then apply the control parameter setting to the hotplate 301. Thereby it does not really matter if the user acts according to the instructions received via the display (or other appropriate output means) of the cooking apparatus 200. The RTS 310 simply measures temperature values as they result from the actually applied control parameter setting.

Such measured temperature values are received 1100 by the control system via the control parameter interface 110. The received temperature data reflects one or more temperature values associated with the food component processed by the RTS 310 in response to the execution of the respective external instruction of the recipe program. The control system 100 has a control parameter evaluator component (CPE) 130 can check 1120 compliance of the received temperature data with control parameters of the respective external instruction(s). The CPE 130 is always aware of the current control parameter setting which is supposed to be applied to the RKA 301. For this purpose, the CPE 130 can be updated by the recipe execution engine 220 with the control parameter values included in the external instructions once the external instruction is executed by the execution engine 220. The CPE 130 can then derive an expected temperature curve for the temperature data to be received from the RTS 310. Such expected temperature data may simply be a constant temperature value over a given time interval if, for example, the RKA 301 was already pre-heated (or pre-cooled) before actually starting the remote food processing steps. In such an embodiment the CPE 130 may simply compare the received temperature values with the temperature value included as control parameter in the external instruction to check compliance of the actually received temperature data with the control parameter setting of the external instruction. The expected temperature data may also reflect an expected rise or a fall in temperature during a given time interval if no pre-heating or pre-cooling occurred. In addition, more complex patterns are possible (e.g., multiple heating and cooling cycles during a given time interval). In one embodiment, the CPE 130 may be connected to a control parameter settings database 150-1 where pre-defined expected temperature value curves can be stored for corresponding control parameter settings. For example, the control parameter settings database 150-1 may include an expected temperature curve for a steak with an average thickness which is supposed to reach a doneness degree "medium" according to predefined temperature settings during a predefined time interval. For example, once the CPE 130 receives the control parameters of the respective external instruction from the recipe execution engine 220 it can retrieve the corresponding expected temperature value curve from the database 150-1 and compare the received actual temperature data with the expected temperature value curve. In case of a deviation of the actual temperature values from the expected temperature values exceeding a predefined tolerance range the CPE 130 identifies non-compliance of the received temperature data with the control parameter setting of the respective external instruction.

In one embodiment, the CPE 130 can compute 1400, based on the received temperature data, a prediction value for the point in time when the execution of the remote food processing step of the RKA 301 in response to the external instruction(s) will terminate. In other words, the CPE 130 can estimate the termination time point of the food processing step for the RKA 301 based on the received temperature data of the RTS 310. For the prediction computation the CPE 130 may use computation mechanisms of different complexity dependent on the temperature behavior. For example, linear regression techniques may be used for time intervals with temperature ramps. In more complex scenarios temperature curves stored in the CPS database 150-1, such as for example non-linear curves like curve 150-1a (cf. FIG. 4), can be used for the computation. The CPE 130 then compares 1500 the prediction value with the termination time point expected according to the control parameters of the recipe program and can determine 1600 a lack of compliance of the received temperature data with the control parameters of the at least one external instruction if the difference between the prediction value and the expected value exceeds a predefined threshold value. A detailed example is explained in FIG. 5.

If the received temperature data is compliant with the control parameter setting in the external instruction, the CPE 130 continues monitoring 1140 until the corresponding remote food processing step is completed by the RKA 301. In case of compliance during the entire remote food processing step the cooking apparatus can proceed 1200 with processing the food product on the cooking apparatus according to internal instructions of the original recipe program. In this case, no re-synchronization of the cooking apparatus 200 and the RKA 301 is performed because the recipe program which is executed at that time by the recipe execution 220 is configured in such a way that the food processing steps of the cooking apparatus and the RKA 301 are always in sync when the food processing steps are correctly performed according to the control parameter settings in the instructions of the executed recipe program.

However, if the checking 1120 of the actual temperature data leads to a determination of non-compliance with the control parameter settings a recipe adjustment step 1300 is performed by a recipe program adjustment (RPA) component 140 of the control system. That is, if the received temperature data does not comply with the control parameters of the at least one external instruction the RPA 140 adjusts 1300 not-yet-executed program instructions of the recipe program based on the evaluation of the received temperature data to re-synchronize the cooking apparatus 200 with the RKA 301.

In case the control system 100 is external to the cooking apparatus 200 the control system may buffer a copy of the recipe program which is currently being executed by the cooking apparatus. The not-yet-executed program instructions can be determined as the program instructions in the buffered copy which follow the instruction that corresponds to the instruction currently being executed by the recipe execution engine 220. Adjusted program instructions are then applied to the buffered copy and sent to the cooking apparatus to replace the corresponding instructions of the recipe program in the recipe program storage 230. In case the control system 100 is an integral component of the cooking apparatus 200, the RPA 140 can perform the adjustment directly to the not-yet-executed instructions of the recipe program stored in the recipe program storage 230. For example, if the CPE 130 determines a termination time point for the current food processing steps of the RKA 301 which is a two minute delay compared to the expected termination time point, then recipe program instructions which depend on the termination of the RKA food processing steps may be adjusted so that the start of the corresponding food processing steps is postponed by two minutes.

The adjustment of recipe instructions can also include the insertion of additional recipe instructions into the recipe program. For example, if the temperature data received from the RTS 310 indicate that the actual temperature at which the steak food component is fried on the hotplate 301 is too high the CPE 130 determines a non-compliance condition and triggers a recipe adjustment. This recipe adjustment may also affect the food processing step currently performed by the hotplate 301. The control system may be communicatively coupled with a recipe program adjustment pattern (RPAP) database 150-2. The RPAP 150-2 can store pre-defined patterns which allow the RPA 140 to derive adjusted recipe instructions based on the findings of the CPE 130. For example, a recipe adjustment pattern for steak frying food processing steps can include multiple value pairs for temperature (T) and frying time (tf) to reach a predefined doneness of the steak. For example, doneness states may be defined as: rare, medium-rare, medium, well-done. For each doneness state multiple value pairs may be defined which allow reaching the respective state. For example, to reach the medium state possible pairs of control parameters (T, tf) may be: (140° C., 120 sec), (135° C., 140 sec), (130° C., 160 sec), (125° C., 180 sec). In case the external instruction for the food processing steps to fry the steak on the hotplate 301 includes a parameter setting (130° C., 160 sec) and the CPA 130 determines after 30 seconds that the actually measured temperature is 140° C. the steak would not reach the state medium after 160 seconds but rather a state close to well-done. To avoid this situation the RPA 140 can insert a recipe instruction to take corrective action. After 30 seconds at 140° C. the steak has already reached 25% of the medium state according to the first value pair. The system can select from different adjustment options which may be prioritized according to pre-defined preferences. For example, an external recipe instruction may be inserted to reduce the remaining frying time of 130 seconds to 90 seconds (at 140° C.). In this case the adjusted control parameter setting corresponds to the first value pair for the medium state. Alternatively, if for example a preference is that the meat is preferably cooked a lower temperatures, the RPA 140 can select from the "medium" adjustment pattern the lower temperature 130° C. In this case the remaining frying time needs to be adjusted to the already passed remote food processing step. That is, only 75% of the time interval for the respective temperature is still to be applied. In the example of the third "medium" value pair the remaining time is computed as 120 seconds leading to the insertion of an external recipe program instruction with the control parameter setting (130° C., 120 sec).

In both alternatives, the time for the remote food processing of the steak at the RKA 301 takes shorter than the originally expected time of 160 sec. As a consequence, not-yet executed program instructions which depend on the result of the steak food processing steps by the RKA 301 are adjusted with regards to the start and stop time points for the corresponding food processing steps. Thus, the following food processing steps are re-synchronized with the modified remote food processing step accordingly.

A food product may include multiple food components to be processed by more than one remote kitchen appliance. For example, a second remote kitchen appliance RKA 302 (e.g., a refrigerator) may be used for cooling cream to a temperature that will produce whipped cream by the cooking apparatus for a desert. In this case, the recipe program has further external instructions affecting the remote food processing steps for cooling performed by the further remote kitchen appliance RKA 302. The RPA 140 is able to also adjust the further external instructions related to the RKA 302 to re-synchronize the food processing steps of the cooking apparatus 200 and of the RKA 302 with the adjusted food processing steps of RKA 301.

In case a further remote temperature sensor is installed to monitor the temperature of the cream food component in the RKA 302 the same principles as previously described for a heating device can be applied to a cooling device by a person skilled in the art.

Figure 4:
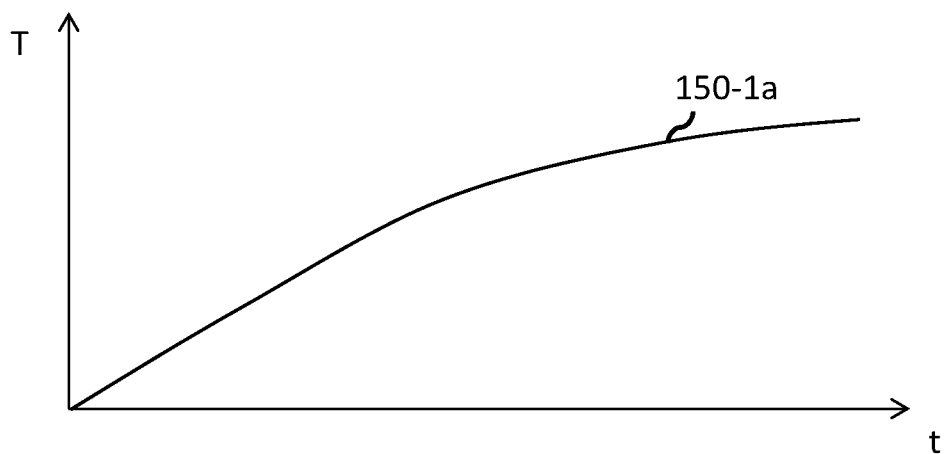
FIG. 4 illustrates a simplified example of a non-linear temperature-over-time curve as it may be stored in a control parameter settings database according to one embodiment of the present disclosure.

FIG. 4 illustrates a simplified example of a non-linear temperature-over-time (T, t) curve 150-1a as it may be stored in the control parameter settings database. Such a curve can be used by the control parameter evaluator to compute, based on the received temperature data, a prediction value for the point in time when the execution of a remote food processing step of a remote kitchen appliance in response to external instruction(s) will terminate. For example, the curve 150-1a may reflect the characteristic behavior of the hotplate in the previously described example. The origin of the curve may correspond to the point when heating starts at room temperature. The right end of the curve may correspond to the maximum temperature which can be reached.

Figure 5A:
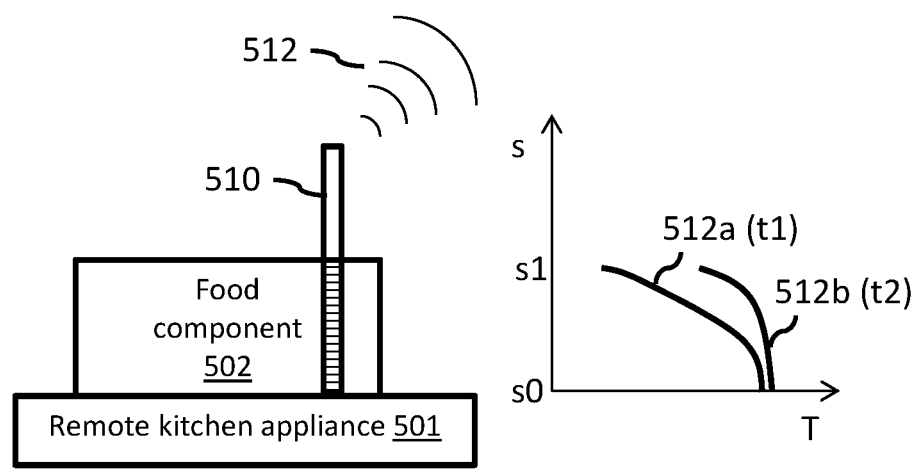
FIGS. 5A-5B illustrate an example embodiment wherein received temperature data includes a spatial temperature profile reflecting temperature gradation inside a food component.
Figure 5B:
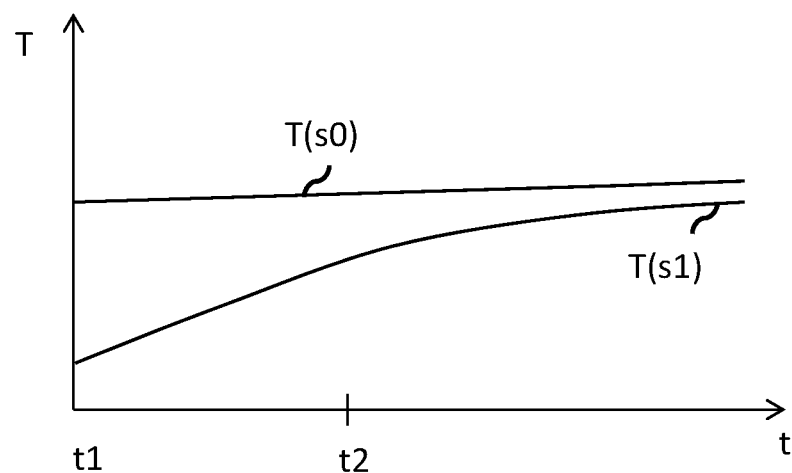

FIGS. 5A and 5B illustrate an example embodiment wherein the received temperature data 512 includes a spatial temperature profile 512a, 512b reflecting the temperature gradation inside the food component 502. In the example, the food component 502 is placed on RKA 501 which may be a hotplate or an equivalent heating device. For example, the food component may be placed in a pan or the like (not illustrated here) on the hotplate. The food component may be a piece of meat (e.g., steak) or a piece of cheese (e.g., Feta) or any other food component which needs to be heated or fried by RKA 501 in response to external instruction(s) of the multi-functional cooking apparatus. In this embodiment, RTS 510 is used to monitor the spatial temperature profile inside the food component 502. RTS 510 intrudes the food component and has multiple sensor sections (shaded area) which can provide a spatial resolution of the temperature profile inside the food component. In the example the food component has a thickness of (s1-s0) where s0 is the origin of a vertical coordinate s at the bottom of the food component 502. For example, a plurality of surface mounted device (SMD) temperature sensors can be mounted in the shaded area of RTS 510 and provide a temperature value at the respective location. In case 5 SMD sensors are spread over the shaded area, temperature data packets 512 can be transmitted (via a wireless or wired connection) to the control system at a predefined sample rate wherein each data packet includes a vector of temperature values with each temperature value corresponding to the temperature of the respective sensor location at a given point in time. In the example, the s(T) diagram illustrates two temperature profiles 512a, 512b at two points in time t1, t2 with t2>t1. At t1 the temperature at s0 is already high whereas the temperature at s1 (upper side of the food component) is still substantially lower. Although the profiles 512a, 512b are illustrated as a continuum the person skilled in the art knows that they illustrate an interpolation of the actually received sample values included in the respective data packets 512a, 512b. At the later point in time t2 the profile 512b illustrates that the temperature at s1 has significantly increased whereas the temperature at s0 only shows a small increase. For example, the various temperature profiles may be representative of the doneness of the food component 520. The profile 512a may represent the "medium" state of a steak and the profile 512b may represent the "well-done" state of the steak. One example of the time dependency of the temperature T at the various food component locations s0, s1 is illustrated in FIG.

5B for a given heating temperature applied to the RKA 501. Dependent on the heating temperature different time curves T(s0), . . . , T(s1) are expected. Such time dependent temperature profile data T(s0), . . . , T(s1) can be stored as expected control parameter settings in the recipe program adjustment patterns database and can be used by the RPA component to generate adjusted recipe instructions in case the CPA detects an incompliance of the remote food processing step on RKA 501 with the control parameter settings of the respective external instruction.

Figure 6A:
FIGS. 6A-6B illustrate a simplified example of a part of a recipe program and its adjustment according to one embodiment of the present disclosure.

FIG. 6A shows a simplified example of a part of a recipe program 601. The recipe program 601 includes control instructions to prepare a food product "beef steak with fried potatoes and pepper sauce." Some of the instruction (steps (e.g., operations) 6, 7, 8, 10) are internal instruction controlling cooking functions of the multi-functional cooking apparatus. Some of the instructions (steps (e.g., operations) 9, 11) are external instructions where the corresponding food processing steps are to be performed by a remote kitchen appliance RKA hotplate.

The food product includes three food components: fried potatoes, spicy pepper sauce and beef steak. In the example, the food processing steps for the fried potatoes and the pepper sauce are performed by the cooking apparatus. The food processing steps for the beef steak are performed by the remote hotplate. It is assumed that the not-shown steps before step 6 include the food processing steps for preparing the pepper sauce to such a degree that it only needs to be re-heated before the food product can be served. Steps 6 to 8 include the control parameters for the cooking apparatus to prepare the fried potatoes in the respective code instructions. In step 6, a user puts 200 g of sliced potatoes into a heating and stirring bowl of the cooking apparatus. Integrated scales verify the weight and the cooking apparatus can provide feedback to the user in case the weight is incorrect. In step 7 some extra oil is added to the potatoes and in step 8 the cooking apparatus is instructed to fry the content of the bowl for fifteen minutes at 80° C. at a low speed (speed=1) to avoid burning of the potatoes.

Once the fried potatoes are prepared, only the frying of the beef steak and the reheating of the pepper sauce remain. Both food processing steps take only a short time and it is important that all steps end at about the same time so that all food components are still hot when served. For this reason, the recipe program is configured to prepare the beef steak in parallel with the reheating of the sauce while the potatoes will remain in the hot bowl in which they are prepared. Therefore, the first external instruction in step 9 includes control parameters to pre-heat the remote hotplate at 125° C. The instruction is either shown to the user via the display of the cooking apparatus or electronically communicated to a hotplate control unit one the potato food processing is completed (Wait=15). Substantially simultaneously (e.g., immediately afterwards) step 10 is performed again by the cooking apparatus instructing the user to remove the bowl with the fried potatoes and replace it with the bowl in which the prepared pepper sauce is stored from earlier food processing steps. The control parameters in the code instructions cause the cooking apparatus to reheat the pepper sauce at 50° C. for six minutes. To ensure that the food components are all done at about the same time the next external instruction for the hotplate waits for three minutes because the expected frying time for the steak is also 3 minutes which causes the cooking apparatus and the hotplate to terminate their food processing steps substantially simultaneously. Thereby it does not matter if the one or the other food component is done a few seconds earlier than the other. However, the time difference should be so small that no substantial cooling of either one of the components occurs which would take the quality and the reproducibility of the overall food product at risk. To achieve the expected food processing time of three minutes for the steak the control parameters for the hotplate in the external instruction include the value pair of (125° C., three minutes). If the recipe is processed by the cooking apparatus and the hotplate according to the control parameter settings in the recipe instructions the cooking apparatus and the hotplate are perfectly synchronized to ensure smooth and reproducible processing of the food product.

Figure 6B:

FIG. 6B shows a modified recipe program 602 with an adjusted recipe instruction in step 12. The recipe adjustment is caused by a deviation of the food processing steps (e.g., operations) performed by the remote hotplate from the control parameter settings in the original recipe. In the example of FIG. 6B it is assumed that the pre-heating hotplate step 6 actually leads to a temperature of 140° C. This may occur because a user has entered a wrong temperature value in the control unit of the hotplate or, in case the control parameters were electronically transmitted from the cooking apparatus to the remote hotplate, the remote hotplate control unit may be de-calibrated and responds to the temperature instruction of 125° C. with a wrong actual temperature setting of 140° C. In either case this will be notified by the actual temperature values received from the remote temperature sensor observing the temperature of the beef steak food component on the hotplate. Assuming that one minute after the start of food processing step 11 the CPE recognizes that the expected temperature of the food component exceeds the expected temperature. Therefore, the CPE can determine that the beef steak will be done one minute earlier than it is expected according to the control parameter settings of the respective external instruction. As a consequence, the parallel processing of the steak and the sauce is not in sync anymore. The CPE can now initiate a recipe adjustment to compensate for the deviation which finally leads to a re-synchronization of the cooking apparatus with the remote hotplate. In the example, the CPE/RPA generate an adjusted recipe instruction which is inserted into the recipe program 602 after step 11 as new step 12. The adjusted instruction is an internal instruction directly applied to the heating function of the cooking apparatus in that the temperature for heating the pepper sauce is increased to 90° C. for one minute so that the heating of the sauce terminates at about the same time as the frying of the steak. Alternatively, dependent on the data available in the CPS and RPAP databases, the recipe adjustment could also affect the external instructions for frying the steak. For example, the temperature could be reduced by a corresponding amount so that the steak frying would still take three minutes as originally expected. However, it may be difficult to reduce the hotplate temperature so quickly because the actual decline in temperature may be delayed quite a bit depending on the heating technology used by the hotplate. Therefore, the adjustment as shown in step 12 may be selected by the control system as the more promising alternative to achieve the reproducible cooking result for the food product.

It is to be noted that a person skilled in the art can apply the disclosed approach for re-synchronizing a multi-function cooking apparatus with one or more remote kitchen appliances by using remote temperature sensor data to generate appropriate recipe adjustments to much more complex scenarios than the previously disclosed examples without a need to become inventive. For example, complex food products like multiple course food products with many food components which are prepared in parallel on a cooking apparatus by using a plurality of remote kitchen appliances which provide heating and/or cooling functions can easily be handled according to embodiments of the present disclosure adapted to the level of complexity by using corresponding pre-defined control parameter settings and recipe program adjustment patterns in the CPE and RPAP databases.

Figure 7:
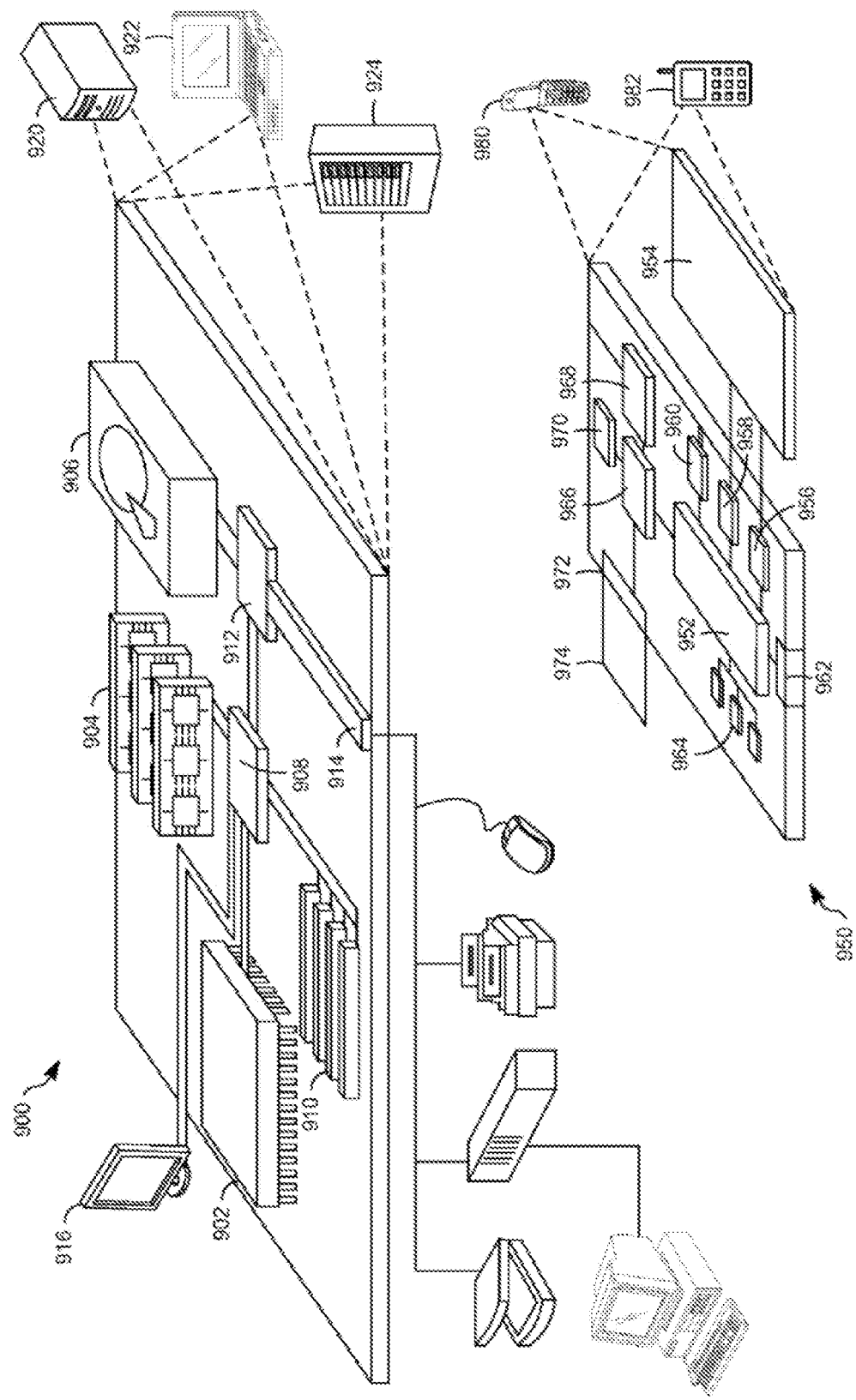
FIG. 7 is a diagram that shows an example of a generic computer device and a generic mobile computer device, which may be used in embodiments of the present disclosure.

FIG. 7 is a diagram that shows an example of a generic computer device 900 and a generic mobile computer device 950, which may be used with the techniques described here. Computing device 900 relates in an exemplary embodiment to the control system 100 (cf. FIG. 1A). Computing device 950 is intended to represent various forms of mobile devices, such as personal digital assistants, cellular telephones, smart phones, and other similar computing devices. In an exemplary embodiment of this disclosure the computing device 950 may serve as a frontend control device of the control system 900. The components shown here, their connections and relationships, and their functions, are meant to be exemplary only, and are not meant to limit implementations of the present disclosures described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, ZigBee, WLAN, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, ZigBee, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps (e.g., operations) may be provided, or steps (e.g., operations) may be eliminated, from the described flows, and other components may be added to, or removed from, the described systems. Accordingly, other embodiments are within the scope of the following claims.

What is claimed is:

1. A control system for synchronizing food processing steps performed by a multi-function cooking apparatus with food processing steps for performance by one or more remote kitchen appliances, the system comprising:
   a recipe program interface having access to a recipe program on a data storage device, wherein the recipe program is configured to be executed by the cooking apparatus and wherein the recipe program has internal instructions configured to control functions of the cooking apparatus for performing food processing steps thereon, and has at least one external instruction for a remote food processing step performed by a first remote kitchen appliance so that food processing steps performed by the cooking apparatus are in sync with food processing steps performed by the first remote kitchen appliance when the food processing steps are performed in compliance with corresponding control parameter settings in the recipe program instructions;

a control parameter interface configured to receive, from a remote temperature sensor inserted into a food component being cooked by the first remote kitchen appliance, temperature data reflecting one or more temperature values associated with a component of food product being processed by the first remote kitchen appliance, in response to the execution of the at least one external instruction;

a control parameter evaluator configured to determine, from the temperature data, a first spatial temperature profile reflecting a first temperature gradation inside the component of food product at a first time, and predict a second spatial temperature profile indicative of a second temperature gradation inside the component of food product at a second time in the future, and further configured to check compliance of the second temperature gradation with control parameters of the at least one external instruction by determining whether occurrence of the second temperature gradation at the second time is within a tolerance range associated with the parameter settings included in the at least one external instruction; and a recipe program adjustment component configured to adjust, not-yet-executed program instructions of the recipe program, if the second spatial temperature profile is predicted not to be reached at the second time within the tolerance range, the adjustment being based on the evaluation of the received temperature data to re-synchronize the cooking apparatus with the first remote kitchen appliance wherein not-yet-executed program instructions correspond to program instructions subsequent to the currently executed program instruction.

2. The control system of claim 1, wherein the recipe program further comprises additional external instructions affecting remote food processing steps performed by a second remote kitchen appliance and wherein the recipe program adjustment component is further configured to adjust the additional external instructions to re-synchronize the cooking apparatus and the second remote kitchen appliance with the first remote kitchen appliance.

3. The control system of claim 1, wherein the control parameter evaluator is further configured to:
compute, based on the received temperature data, a prediction value for a point in time when the execution of the remote food processing step of the first remote kitchen appliance, in response to the at least one external instruction will terminate;
compare the prediction value with a termination time value expected according to the control parameters of the recipe program; and
determine a lack of compliance of the received temperature data with the control parameters of the at least one external instruction if the difference between the prediction value and the expected value exceeds a predefined threshold value.

4. The control system of claim 1, wherein the recipe program adjustment component is configured to adjust one or more internal instructions of the not-yet-executed program instructions.

5. The control system of claim 1, wherein the recipe program adjustment component is configured to adjust one or more external instructions of the not-yet-executed program instructions.

6. A multi-function cooking apparatus comprising the control system according to claim 1.

* * * * *